(12) United States Patent
Sisk et al.

(10) Patent No.: US 7,316,507 B2
(45) Date of Patent: Jan. 8, 2008

(54) ELECTRONIC THERMOMETER WITH FLEX CIRCUIT LOCATION

(75) Inventors: Ricky A. Sisk, Washington, MO (US); Joseph T. Gierer, Glen Carbon, IL (US); Mark Davis, O'Fallon, MO (US)

(73) Assignee: Covidien AG (CH)

( * ) Notice: Subject to any disclaimer, the term of this patent is extended or adjusted under 35 U.S.C. 154(b) by 0 days.

(21) Appl. No.: 11/265,984

(22) Filed: Nov. 3, 2005

(65) Prior Publication Data

US 2007/0098040 A1    May 3, 2007

(51) Int. Cl.
*G01K 1/16*    (2006.01)
*G01K 7/22*    (2006.01)

(52) U.S. Cl. .................... 374/208; 374/16 H; 374/100; 374/183; 702/133

(58) Field of Classification Search ................ 374/163, 374/164, 183, 185, 208; 702/130, 133
See application file for complete search history.

(56) References Cited

U.S. PATENT DOCUMENTS

| | | |
|---|---|---|
| 3,702,076 A | 11/1972 | Georgi |
| 3,729,998 A | 5/1973 | Mueller et al. |
| 3,893,058 A | 7/1975 | Keith |
| 3,915,003 A | 10/1975 | Adams |
| 4,008,614 A | 2/1977 | Turner et al. |
| 4,054,057 A | 10/1977 | Kluge |
| 4,112,762 A | 9/1978 | Turner et al. |
| 4,159,766 A | 7/1979 | Kluge |
| 4,161,880 A | 7/1979 | Prosky |
| 4,183,248 A | 1/1980 | West |
| 4,411,535 A | 10/1983 | Schwarzschild |
| 4,464,067 A | 8/1984 | Hanaoka |
| 4,487,208 A | 12/1984 | Kamens |
| 4,531,842 A | 7/1985 | Schonberger |
| 4,536,851 A | 8/1985 | Germanton et al. |
| 4,572,365 A | 2/1986 | Bruno et al. |
| 4,574,359 A | 3/1986 | Ishizaka et al. |
| 4,592,000 A | 5/1986 | Ishizaka et al. |
| 4,602,871 A | 7/1986 | Hanaoka |
| 4,629,336 A | 12/1986 | Ishizaka |
| 4,642,785 A | 2/1987 | Packard et al. |
| 4,727,500 A | 2/1988 | Jackson et al. |
| 4,728,199 A | 3/1988 | Murai et al. |
| 4,729,672 A | 3/1988 | Takagi |
| 4,733,974 A | 3/1988 | Hagerman |
| 4,735,512 A | 4/1988 | Suzuki |
| 4,762,429 A | 8/1988 | Fujikawa |
| 4,771,791 A | 9/1988 | Kubouchi |
| 4,811,198 A | 3/1989 | Ota et al. |

(Continued)

FOREIGN PATENT DOCUMENTS

FR    2580806    10/1986

(Continued)

*Primary Examiner*—Gail Verbitsky
(74) *Attorney, Agent, or Firm*—Edward S Jarmolowicz

(57) ABSTRACT

An electronic thermometer is configured for ease and accuracy in construction. A probe of the thermometer includes a flex circuit containing electronic components used to measure temperature and transmit signals to a calculating unit of the thermometer. A locating member supported by the probe can function to pre-position the flex circuit prior to final fixation so that the electronic components are reliably positioned in manufacture.

24 Claims, 15 Drawing Sheets

U.S. PATENT DOCUMENTS

| | | | |
|---|---|---|---|
| 4,843,577 A | 6/1989 | Muramoto | |
| 4,866,621 A | 9/1989 | Ono | |
| 4,878,184 A | 10/1989 | Okada et al. | |
| D309,866 S | 8/1990 | Fukuda et al. | |
| 4,986,669 A | 1/1991 | Yamaguchi | |
| 5,011,294 A | 4/1991 | Yamaguchi | |
| 5,013,161 A | 5/1991 | Zaragoza et al. | |
| 5,037,488 A * | 8/1991 | Wienand | 136/230 |
| 5,066,141 A | 11/1991 | Ikeda et al. | |
| 5,116,136 A | 5/1992 | Newman et al. | |
| 5,133,606 A | 7/1992 | Zaragoza et al. | |
| 5,165,798 A | 11/1992 | Watanabe | |
| 5,178,468 A * | 1/1993 | Shiokawa et al. | 374/185 |
| 5,259,389 A | 11/1993 | Muramoto et al. | |
| 5,388,134 A | 2/1995 | Douglass et al. | |
| 5,392,031 A | 2/1995 | Toriumi et al. | |
| 5,458,121 A * | 10/1995 | Harada | 600/474 |
| 5,473,629 A | 12/1995 | Muramoto | |
| 5,513,235 A | 4/1996 | Douglass et al. | |
| 5,632,555 A | 5/1997 | Gregory et al. | |
| 5,725,308 A | 3/1998 | Smith et al. | |
| 5,738,441 A | 4/1998 | Cambridge et al. | |
| D395,609 S | 6/1998 | Knieriem et al. | |
| 5,820,263 A | 10/1998 | Ciobanu | |
| 6,000,846 A | 12/1999 | Gregory et al. | |
| 6,293,700 B1 | 9/2001 | Lund et al. | |
| 6,383,144 B1 | 5/2002 | Mooney et al. | |
| 6,588,931 B2 * | 7/2003 | Betzner et al. | 374/185 |
| 6,827,487 B2 | 12/2004 | Baumbach | |
| 6,839,651 B2 | 1/2005 | Lantz et al. | |
| 6,976,783 B2 * | 12/2005 | Chen | 374/163 |
| 2003/0023398 A1 | 1/2003 | Lantz et al. | |
| 2003/0176810 A1 | 9/2003 | Maahs et al. | |
| 2004/0071182 A1 | 4/2004 | Tesi et al. | |
| 2004/0071188 A1 | 4/2004 | Knieriem et al. | |
| 2004/0105487 A1 | 6/2004 | Chen | |
| 2004/0146087 A1 | 7/2004 | Penney et al. | |
| 2005/0083994 A1 | 4/2005 | Wawro et al. | |

FOREIGN PATENT DOCUMENTS

| | | |
|---|---|---|
| GB | 2266771 | 11/1993 |
| JP | 6-241914 | 9/1994 |
| WO | WO 98/50766 | 11/1998 |
| WO | WO 01/31305 A1 | 5/2001 |

* cited by examiner

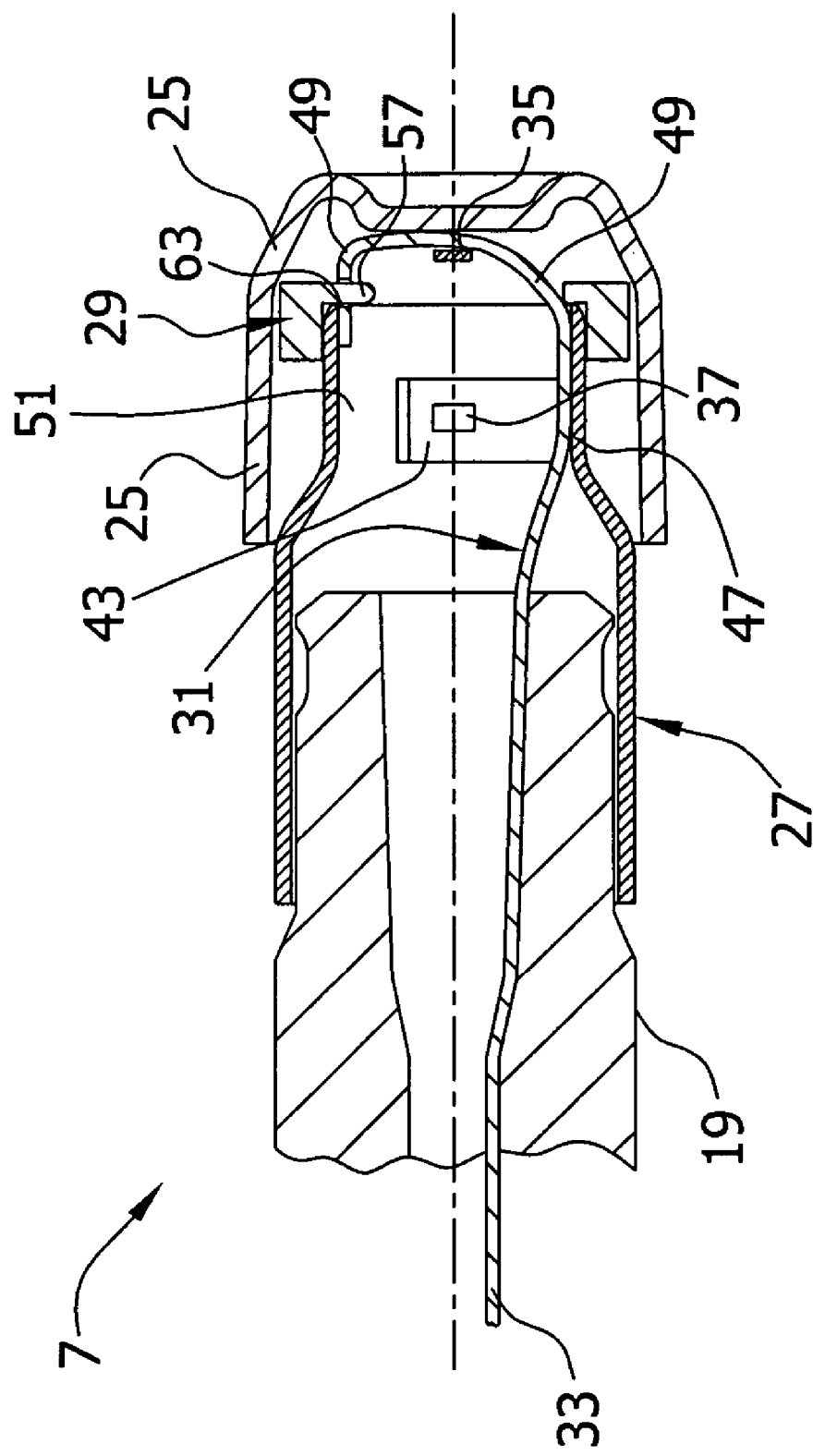

ELECTRONIC THERMOMETER WITH FLEX CIRCUIT LOCATION

BACKGROUND OF THE INVENTION

The invention pertains to the field of electronic thermometers and more particularly the field of fast response electronic thermometers employing a sensor probe.

Electronic thermometers are widely used in the healthcare field for measuring a patient's body temperature. Typical electronic thermometers have the form of a probe with an elongated shaft. Electronic temperature sensors such as thermistors or other temperature sensitive elements are contained within the shaft portion. In one version, the probe includes a cup-shaped aluminum tip at its free end. A thermistor is placed in thermal contact with the aluminum tip inside the probe. When a free end portion is placed, for example, in a patient's mouth, the tip is heated up by the patient's body and the thermistor measures the temperature of the tip. Additional electronics connected to the electronic sensor components may be contained within a base unit connected by wire to the shaft portion or may be contained within a handle of the shaft portion, for example. Electronic components receive input from the sensor components to compute the patient's temperature. The temperature is then typically displayed on a visual output device such as a seven segment numerical display device. Additional features of known electronic thermometers include an audible temperature level notification such as a beep or tone alert signal. A disposable cover or sheath is typically fitted over the shaft portion and disposed after each use of the thermometer for sanitary reasons.

Electronic thermometers have many advantages over conventional thermometers and have essentially replaced the use of conventional glass thermometers in the healthcare field. One advantage of electronic thermometers over their conventional glass counterparts is the speed at which a temperature reading can be taken. Several procedures are used to promote a rapid measurement of the subject's temperature. One technique employed is to use predictive algorithms as part of thermometer logic to extrapolate the temperature measurements from the thermistor in contact with the tip to arrive at a temperature reading in advance of the tip reaching equilibrium with the body temperature. Another technique that can be employed simultaneously with a predictive algorithm is to heat the probe to near the body temperature so that part of the probe away from the tip does not act as a heat sink, allowing the tip to reach a temperature close to the body temperature more rapidly. Heating can be accomplished by a resistor placed in contact with the probe. Another thermistor may be placed in contact with the probe to measure the amount the resistor is heating the probe, which is used to control the heating. It is also known to use an isolator to reduce heat loss from the tip to other parts of the probe. Co-assigned U.S. Pat. No. 6,839,651 discloses the use of such an isolator and is incorporated herein by reference.

To assemble the probe, the circuitry (e.g., the thermistors and resistor) is mounted on a flexible substrate that supports and provides electrical connection for the components. The combination of the components and the flexible substrate is commonly called a "flex circuit". The substrate may be initially flat to facilitate ease of mounting the components, but can be bent into position upon assembly into the probe. More specifically, the flexible substrate is bent to place one thermistor in position for contacting the probe tip, and to place the resistor and other thermistor in contact with a separator adjacent the probe tip. These components can be glued in place with a thermally conductive adhesive in the final assembly. However, before the adhesive is brought into contact with the components and/or before the adhesive sets, the components may undesirably move. The result of motion can be insufficient contact of the components with the tip and/or separator to heat or sense temperature in the final assembly. Preferably, such assembly failures should be minimized or avoided, and a highly repeatable assembly process is achieved.

SUMMARY OF THE INVENTION

In one aspect of the present invention, an electronic thermometer generally comprises a probe tip adapted to be heated to a temperature by an object forth use in measuring the temperature of the object. A deformable circuit element includes a deformable electrical conductor and at least one temperature sensor connected to the electrical conductor for detecting the temperature of the probe tip. A probe shaft supports the probe tip and deformable circuit element and includes an end portion. A separator is supported by the probe shaft. A locating member supported by the probe shaft is formed for at least temporarily locating the deformable circuit element.

In another aspect of the present invention, a probe having substantially the same construction as set for in the preceding paragraph.

In yet another aspect of the present invention, a method of making a probe for an electronic thermometer generally comprises positioning a deformable circuit element together with a probe shaft and deforming the deformable circuit element. A locating member is connected to the probe shaft. The deformable circuit element and locating member are interconnected for use in locating the deformable circuit element.

Other features of the present invention will be in part apparent and in part pointed out hereinafter.

BRIEF DESCRIPTION OF THE DRAWINGS

FIG. 3A is an enlarged, fragmentary section of the probe;

Corresponding reference characters indicate corresponding parts throughout the several views of the drawings.

DETAILED DESCRIPTION

Figure 1:
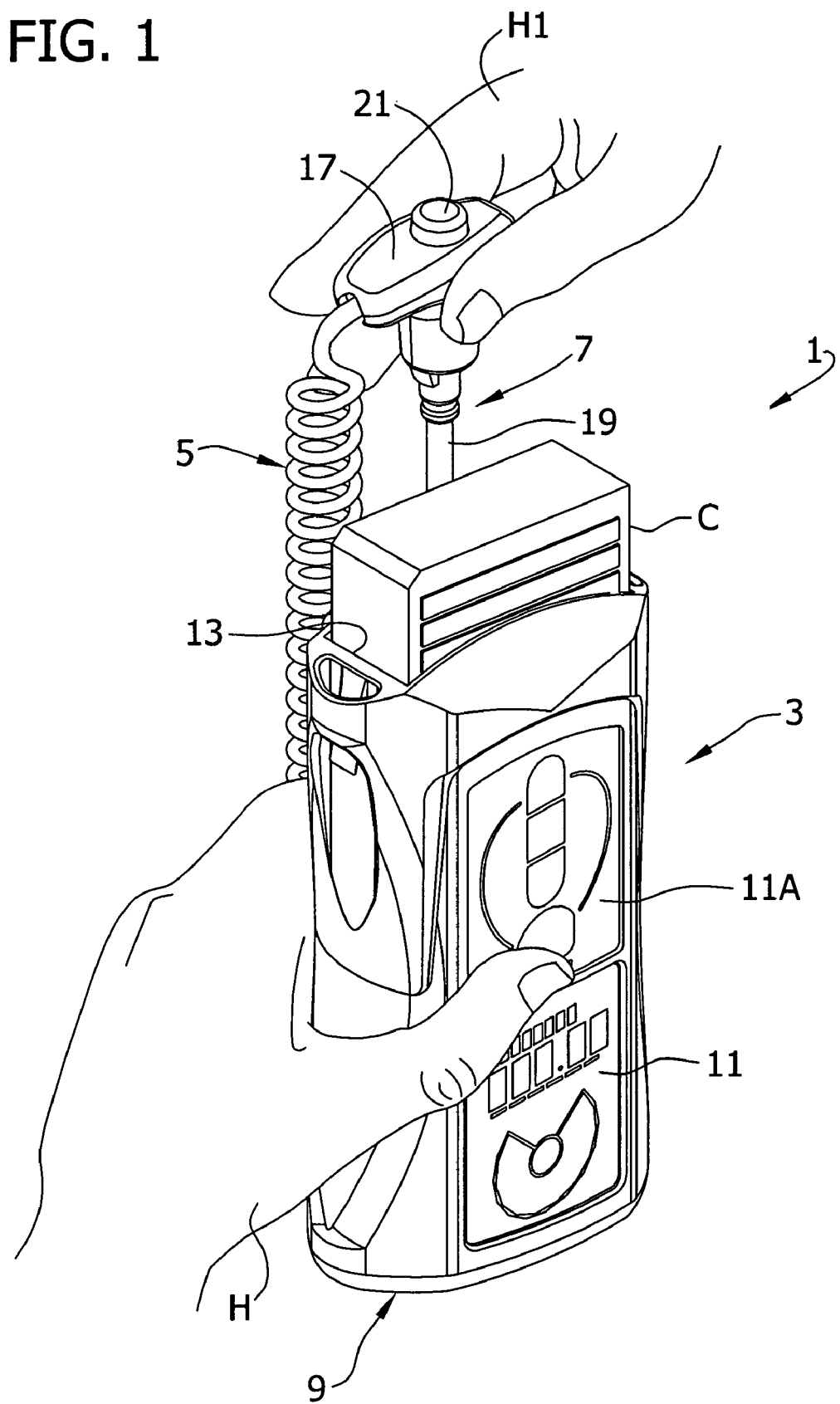
FIG. 1 is a perspective of an electronic thermometer.
Figure 2:
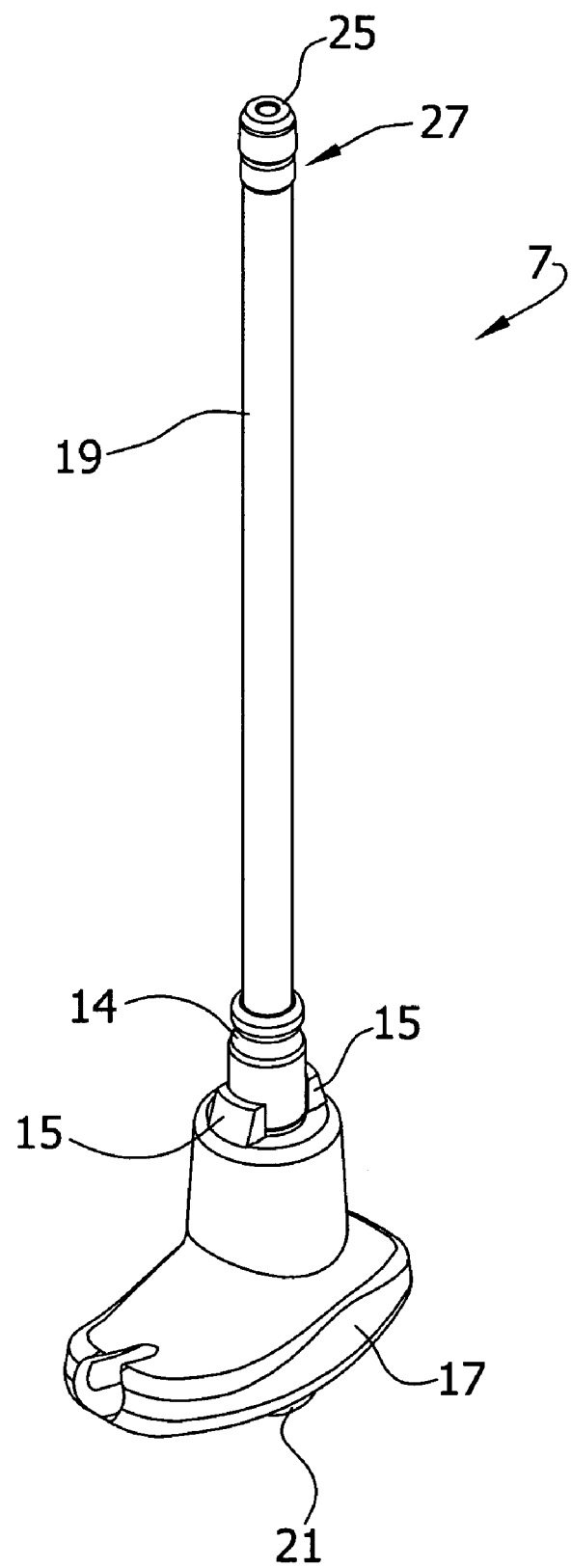
FIG. 2 is a perspective of a probe of the electronic thermometer.

Referring now to the drawings and in particular to FIGS. 1 and 2, an electronic thermometer constructed according to the principles of the present invention is indicated generally at 1. The electronic thermometer comprises a temperature calculating unit, indicated generally at 3, that is sized and shaped to be held comfortably in the hand H. The calculating unit 3 (broadly, "a base unit") is connected by a helical cord 5 to a probe 7 (the reference numerals indicating their subjects generally). The probe 7 is constructed for contacting the object (e.g., a patient) and sending signals to the calculating unit 3 representative of the temperature. The calculating unit 3 receives the signals from the probe 7 and uses them to calculate the temperature. Suitable circuitry for performing these calculations is contained within a housing 9 of the calculating unit 3. The logic in the circuitry may include a predictive algorithm for rapidly ascertaining the final temperature of the patient. The circuitry makes the calculated temperature appear on a LCD display 11 on the front of the housing 9. Other information desirably can appear on the display 11, as will be appreciated by those of ordinary skill in the art. A panel 11A of buttons for operating the thermometer 1 is located just above the display 11.

The housing 9 includes a compartment (not shown) generally at the rear of the housing that can receive a distal portion of the probe 7 into the housing for holding the probe and isolating the distal portion from the environment when not in use. FIG. 1 illustrates the probe 7 being pulled by the other hand H1 from the compartment in preparation for use. The housing 9 also has a receptacle 13 that receives a suitable container such as a carton C of probe covers (not shown). In use, the top of the carton C is removed, exposing open ends of the probe covers. The distal portion of the probe 7 can be inserted into the open end of the carton C and one of the probe covers can be captured (e.g., snapped into) an annular recess 14. Pushers 15 are located at the junction of a handle 17 of the probe 7 with a probe shaft 19. The probe shaft is protected from contamination by the cover when the distal portion of the probe shaft 19 is inserted, for example, into a patient's mouth. A button 21 on the probe handle 17 can be depressed to cause the pushers 15 to move for releasing the probe cover from the probe shaft 19. Subsequent to use, the probe cover can be discarded. Other ways of capturing and releasing probe covers may be used without departing from the scope of the present invention.

Figure 3:
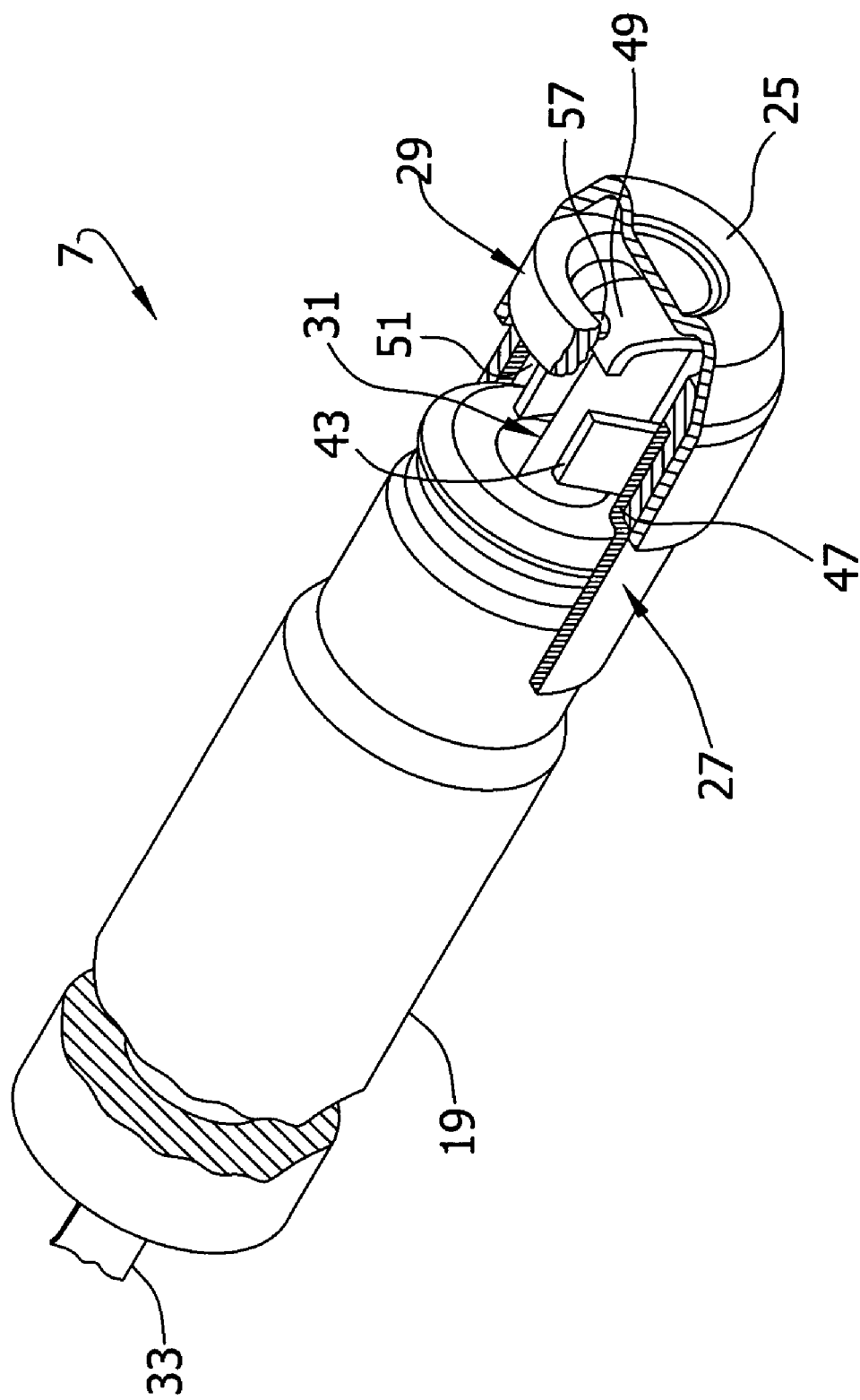
FIG. 3 is a fragmentary perspective of the probe with parts broken away to show internal construction.

An aluminum tip 25 at the distal end of the probe shaft 19 is heated up by the patient and the temperature of the tip is detected, as will be described more fully hereinafter. The probe cover is preferably made of highly thermally conductive material, at least at the portion covering the tip 25, so that the tip can be rapidly heated by the patient. Referring now to FIGS. 3 and 3A, the tip 25 and distal end of the probe shaft 19 are partially broken away (or shown in section) to reveal components used to measure the temperature of the tip. A generally tubular separator, generally indicated at 27, is mounted on the distal end of the probe shaft 19 and extends generally into the open bottom of the tip 25, but does not engage the tip. An isolator indicated generally at 29 is mounted on the end of the separator 27 and engages the tip 25 for use in mounting the tip on the probe shaft 19. The probe shaft, tip 25, separator 27 and isolator 29 (broadly, "a locating member") may be connected together in a suitable fashion. A flex circuit, generally indicated at 31, includes a deformable substrate 33 mounting a tip thermistor 35, a separator thermistor 37 and a heating resistor 39 (see, FIG. 4). The tip thermistor 35 is in thermal contact with the tip 25, and the separator thermistor 37 and heating resistor 39 are in thermal contact with the separator 27. It will be appreciated that other electrical components (not shown) and other arrangements and numbers of components may be used without departing from the scope of the present invention.

The tip thermistor 35, separator thermistor 37 and resistor 39 are powered by batteries (not shown) located in the housing 9 of the thermometer 1. It will be understood that other suitable power sources could be employed. The power source need not be located in the calculating unit housing 9 and it is envisioned that the calculating unit 3 could be omitted within the scope of the present invention. The tip thermistor 35 generates a signal that is representative of the temperature of the tip 25. The signal is transmitted by one or more electrical conductors in the flex circuit substrate 33 to the circuitry in the housing 9. The separator thermistor 37 generates a signal that is representative of the temperature of the separator 27. The resistor 39 is powered by the batteries and heats the separator 27 so that the aluminum tip 25 can reach the temperature of the patient more rapidly. Monitoring the temperature of the separator 27 with the separator thermistor 37 allows the heating of the resistor 39 to be controlled to best effect. For instance, the separator 27 can be initially rapidly heated, but then heated intermittently as the separator nears or reaches a pre-selected temperature. The function and operation of these components are known to those of ordinary skill in the art.

Figure 4:
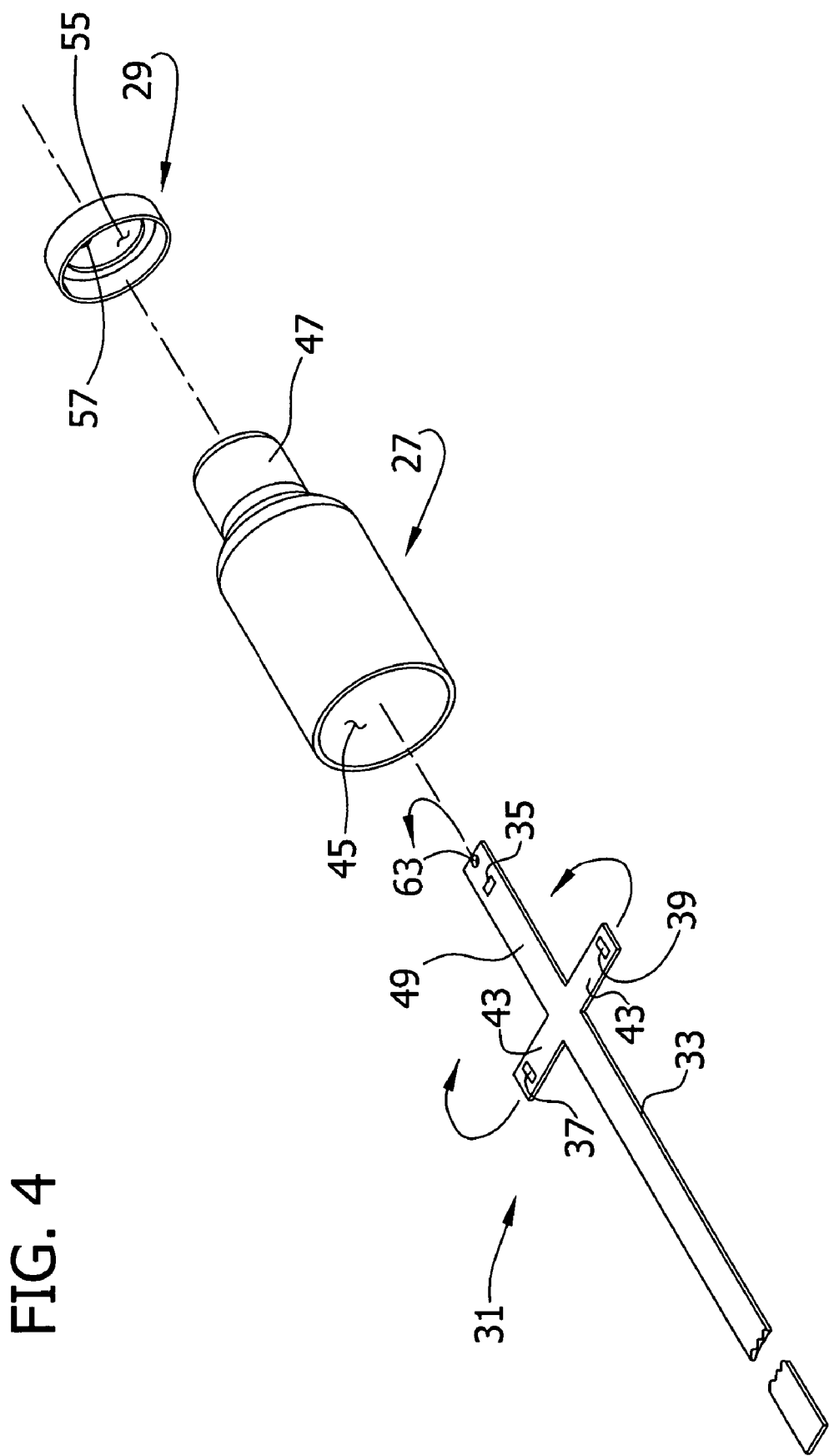
FIG. 4 is an exploded perspective of a flex circuit, separator and isolator of the probe.
Figure 5:
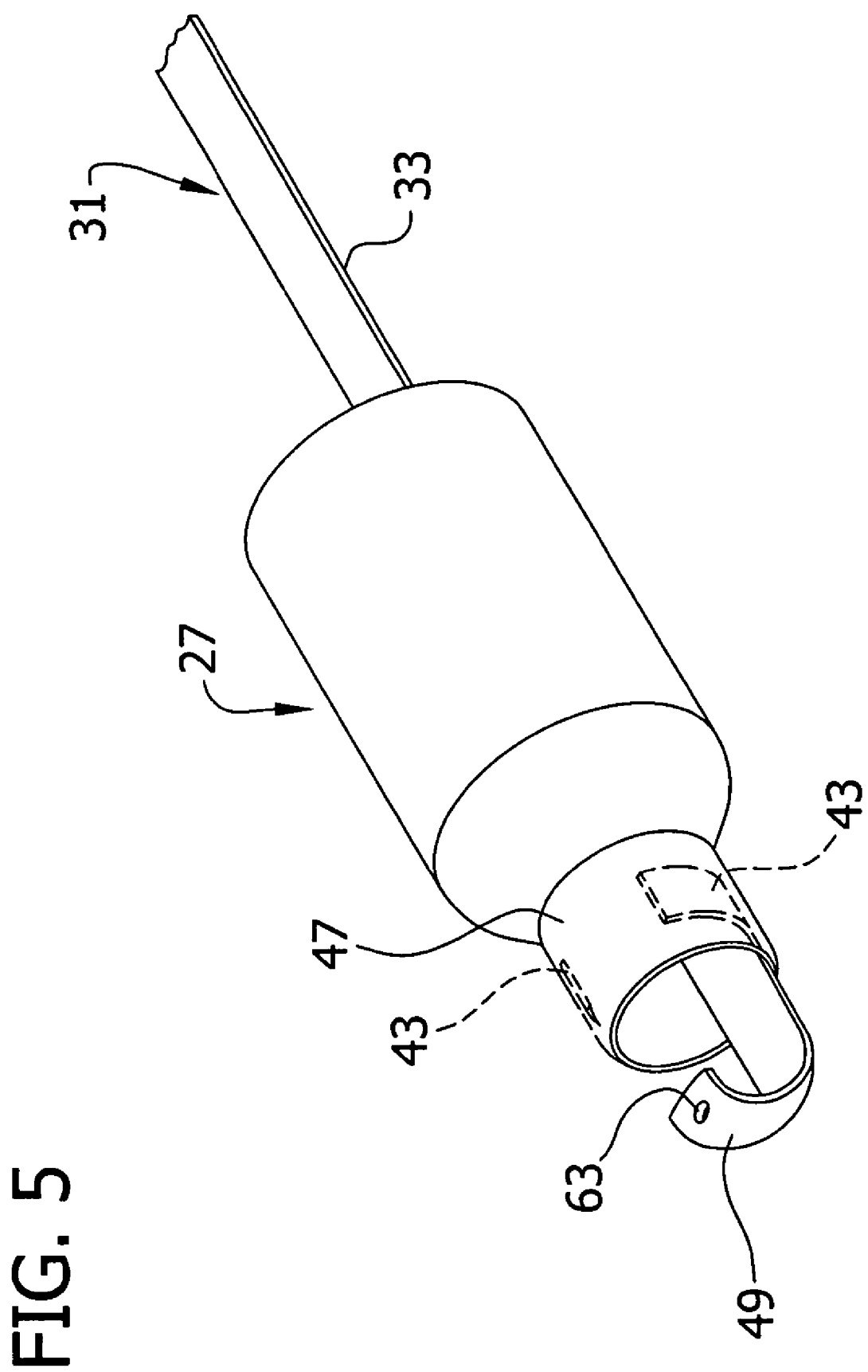
FIG. 5 is a perspective of the flex circuit received in the separator during assembly.

Referring now to FIG. 4, the flex circuit 31 (broadly, "a deformable circuit element"), separator 27 and isolator 29 are schematically illustrated prior to assembly. The flex circuit substrate 33 has a flat, cruciform shape that unless deformed would not fit into the separator 27. To assemble the flex circuit 31 and separator 27, arms 43 of the flex circuit substrate 33 are bent inwardly toward each other (in the directions indicated by arrows in FIG. 4) so that the flex circuit substrate assumes a somewhat cylindrical configuration and the separator thermistor 37 and resistor 39 are located on the outside of the flex circuit substrate. The flex circuit 31 can be inserted through a larger open end 45 of the separator 27 to a position in which the separator thermistor 37 and resistor 39 are located in a neck 47 of the separator, and a head 49 of the flex circuit substrate 33 mounting the tip thermistor 35 projects out of a smaller open end (not shown) of the separator (see FIG. 5). Preferably, the flex circuit substrate 33 is resilient so that the arms 43 tend to push outwardly against an interior wall 51 of the separator 27 to bring portions of the outer surface of the substrate opposite the separator thermistor 37 and resistor 39 into contact with the interior wall. A thermally conducting epoxy or other suitable adhesive (not shown) is preferably applied to the contacting portions of the outer surface of the substrate 33 and/or to the interior of the neck 47 of the separator 27 prior to insertion of the flex circuit substrate 33 so that when the substrate portions make contact with the interior wall 51 of the neck, they are held in place.

Figure 6:
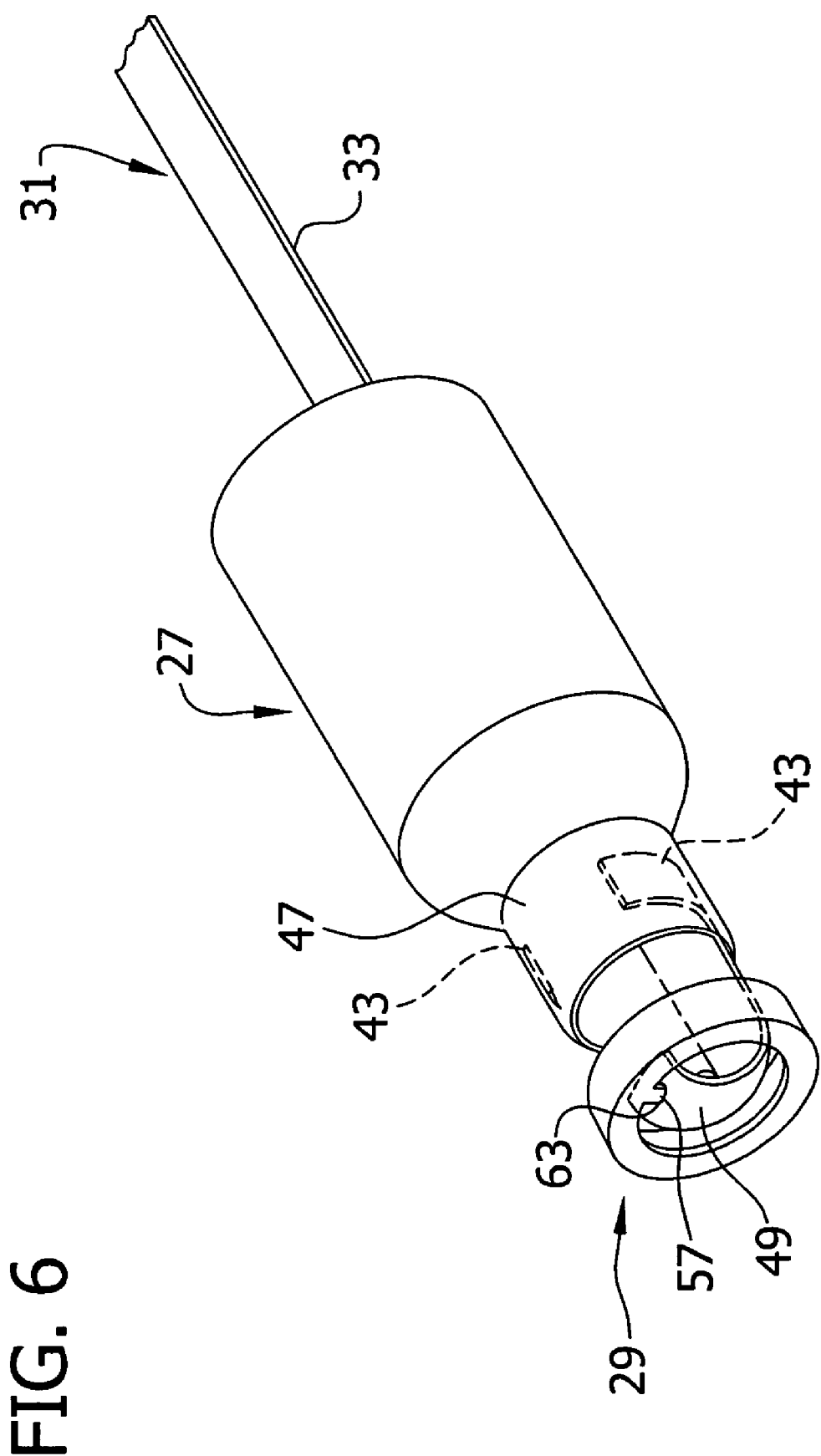
FIG. 6 is a perspective of the separator and the flex circuit deformed to receive the isolator.
Figure 8:
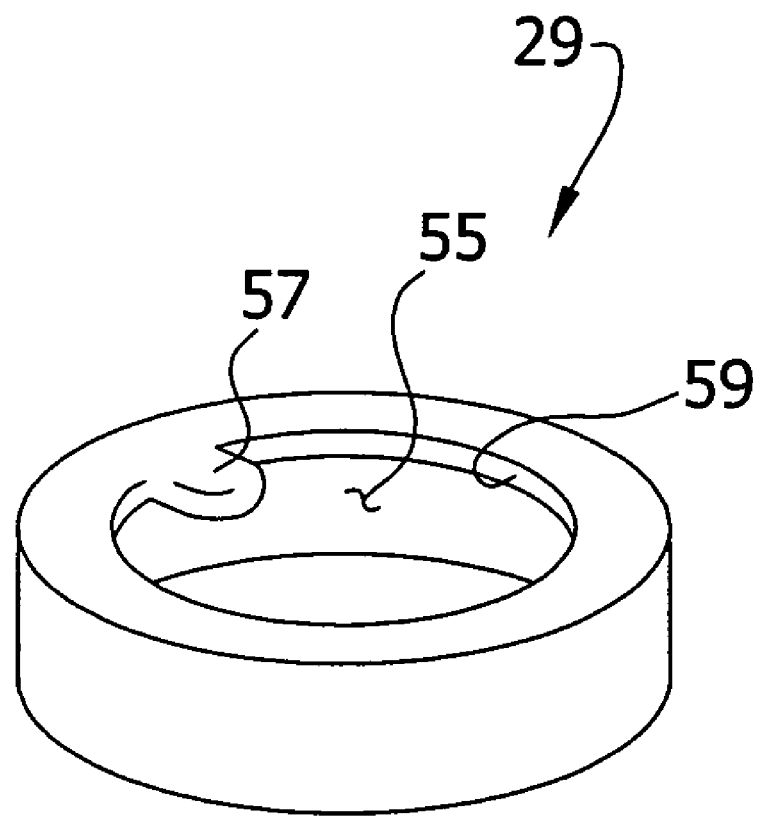
FIG. 8 is an enlarged perspective of the isolator.

Referring to FIG. 6, the head 49 of the flex circuit substrate 33 is bent over in a generally inverted-U configuration and the isolator 29 is moved onto the flex circuit 31 with the bent head being received in a central opening 55 of the isolator. The isolator 29 has a nub 57 (broadly, "locating structure") located on an inner diameter surface 59 of the isolator and projecting inwardly into the central opening 55 (see also FIG. 8). Preferably, the isolator 29 is made of a material that is a poor thermal conductor to minimize thermal communication between the tip 25 and the separator 27. An aperture 63 in the head 49 of the flex circuit substrate 33 is aligned with the nub 57. When a force holding the head 49 of the substrate 33 in the bent, inverted-U position is released, the head tries to move back toward its unbent configuration. The movement of the substrate 33 causes the aperture 59 to move over the nub 57, capturing the free end of the head 49 and preventing it from moving further toward its undeformed configuration. A diametrically opposite part of the head 49 engages a side of the interior diameter surface 59 of the isolator 29 generally opposite the nub 57. An adhesive may be applied to further assist holding the head 49 on the nub 57. The isolator 29 can be pushed down (e.g., press-fit) onto the separator 27. In this way, the isolator 29 can act to preliminarily locate the head 49 of the substrate 33 and the tip thermistor 35 prior to final assembly. This accurate location of the flex circuit 31 is highly repeatable for manufacturing assembly of the probe 7.

Figure 7:
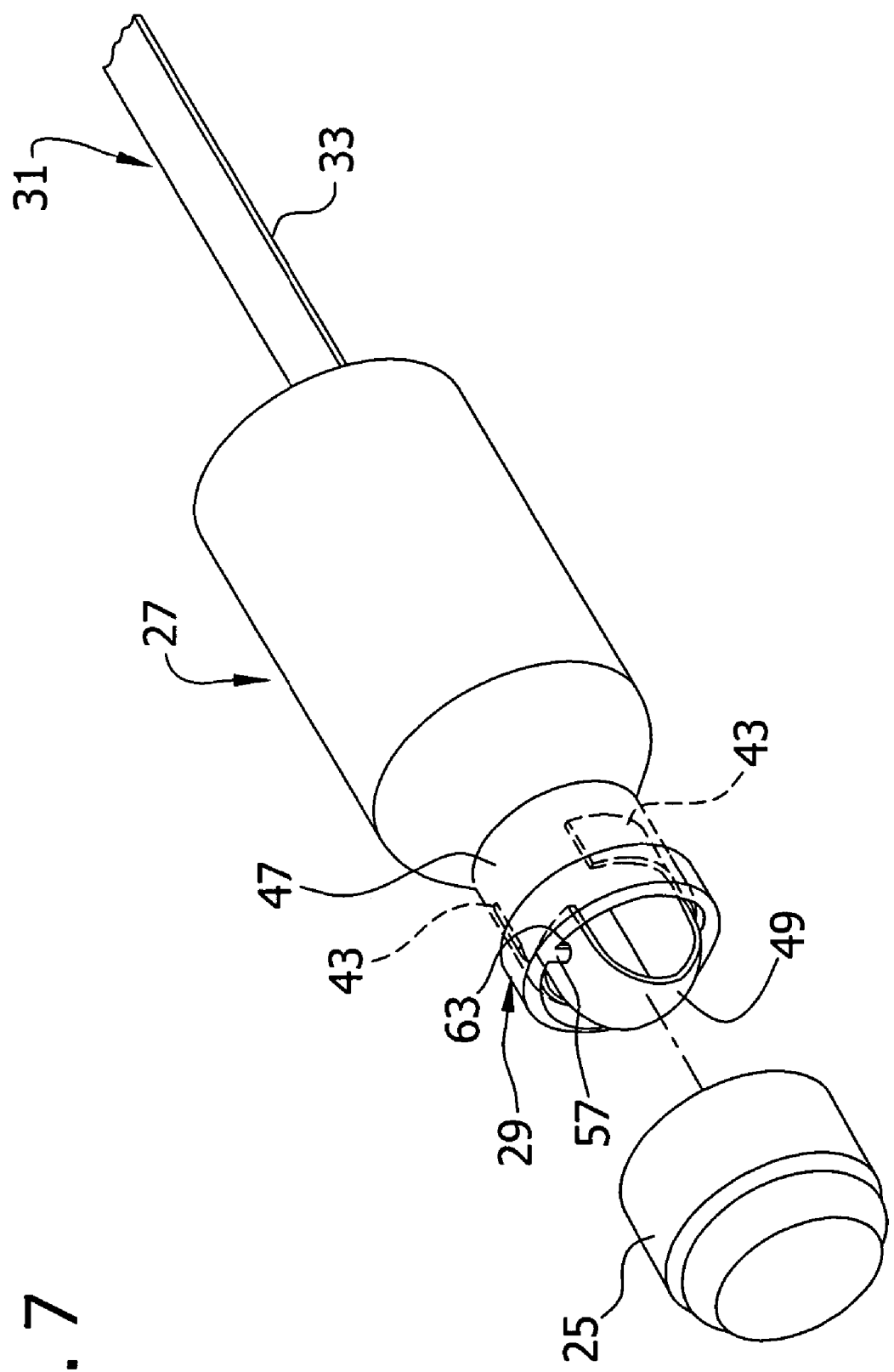
FIG. 7 is a perspective of the assembled flex circuit, separator and isolator with a tip of the probe being placed over the isolator.

The tip 25 can be secured to the subassembly of the flex circuit 31, separator 27 and isolator 29, as illustrated in FIG. 7. The resilience of the flex circuit substrate 33 causes it to act as a spring in its deformed condition to bias the flex circuit head 49 and the tip thermistor 35 toward the tip 25 for good thermal contact of a portion of the head generally opposite to the tip thermistor with the tip. An epoxy or other adhesive may be applied on the separator 27 at the base of the neck 47. An epoxy can also be applied to either or both of the portion of the outer surface of the head 49 that will contact the tip 25, and the interior of the tip. The tip 25 is pushed onto the separator 27 so that the bent head 49 of the flex circuit substrate 33, the isolator 29 and the neck 47 of the separator are received in the tip 25. The tip thermistor 35 is positioned by the isolator 29 so that the portion of the outer surface of the head directly opposite the tip thermistor will make contact with the tip 25 substantially in its center. Preferably, the center of the tip 25 is substantially flat to further facilitate good contact for transfer of heat from the tip, through the substrate 33 and to the tip thermistor 35. The epoxy can be cured to finally secure the tip 25 and portion of the flex circuit substrate head 49 carrying the tip thermistor 35, as well as securing the portions of the flex circuit arms 43 carrying the separator thermistor 37 and resistor 39 to the separator 27. The bottom portion of the flex circuit substrate 33 can be slid into the probe shaft 19 and electrical connections made at the handle 17 of the probe 7 for connection to the cord 5 and hence the circuitry in the housing 9. This assembly step may occur prior to the steps of deforming the flex circuit substrate 33, and applying the separator 27, isolator 29 and tip 25 that are described previously herein.

Figure 9:
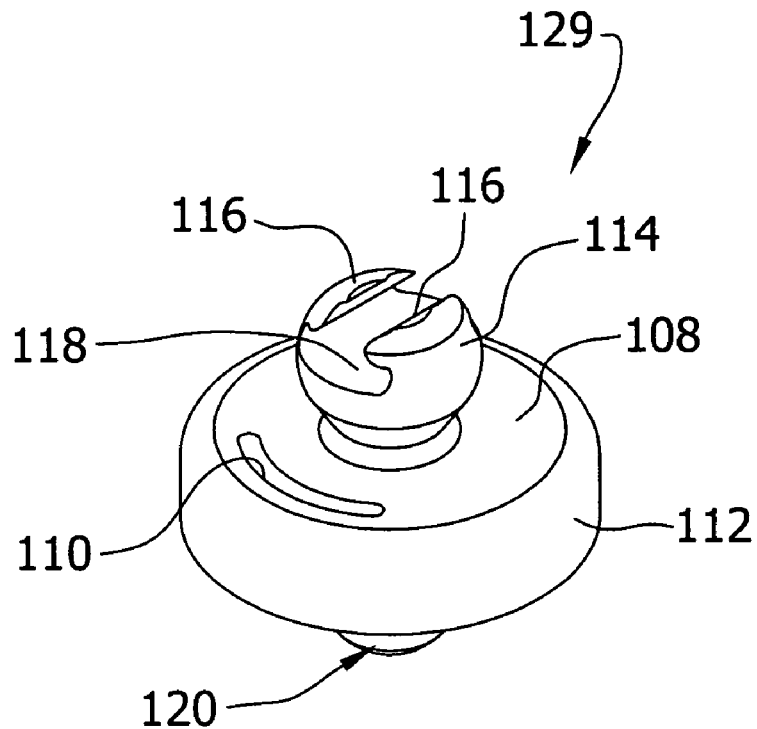
FIG. 9 is a top side perspective of another version of an isolator for a probe of a second embodiment.
Figure 10:
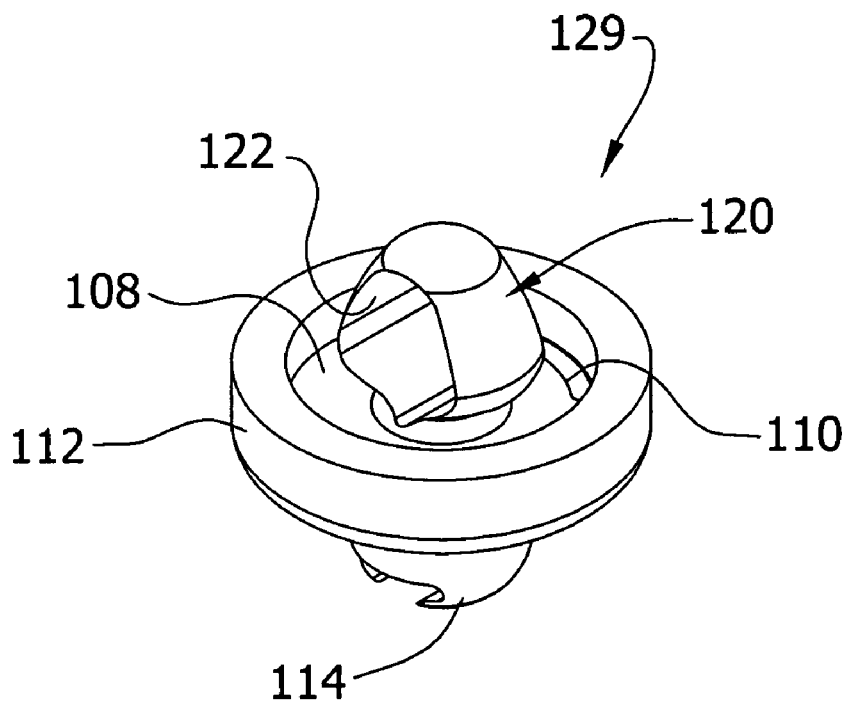
FIG. 10 is a bottom side perspective of the isolator of FIG. 9.
Figure 11:
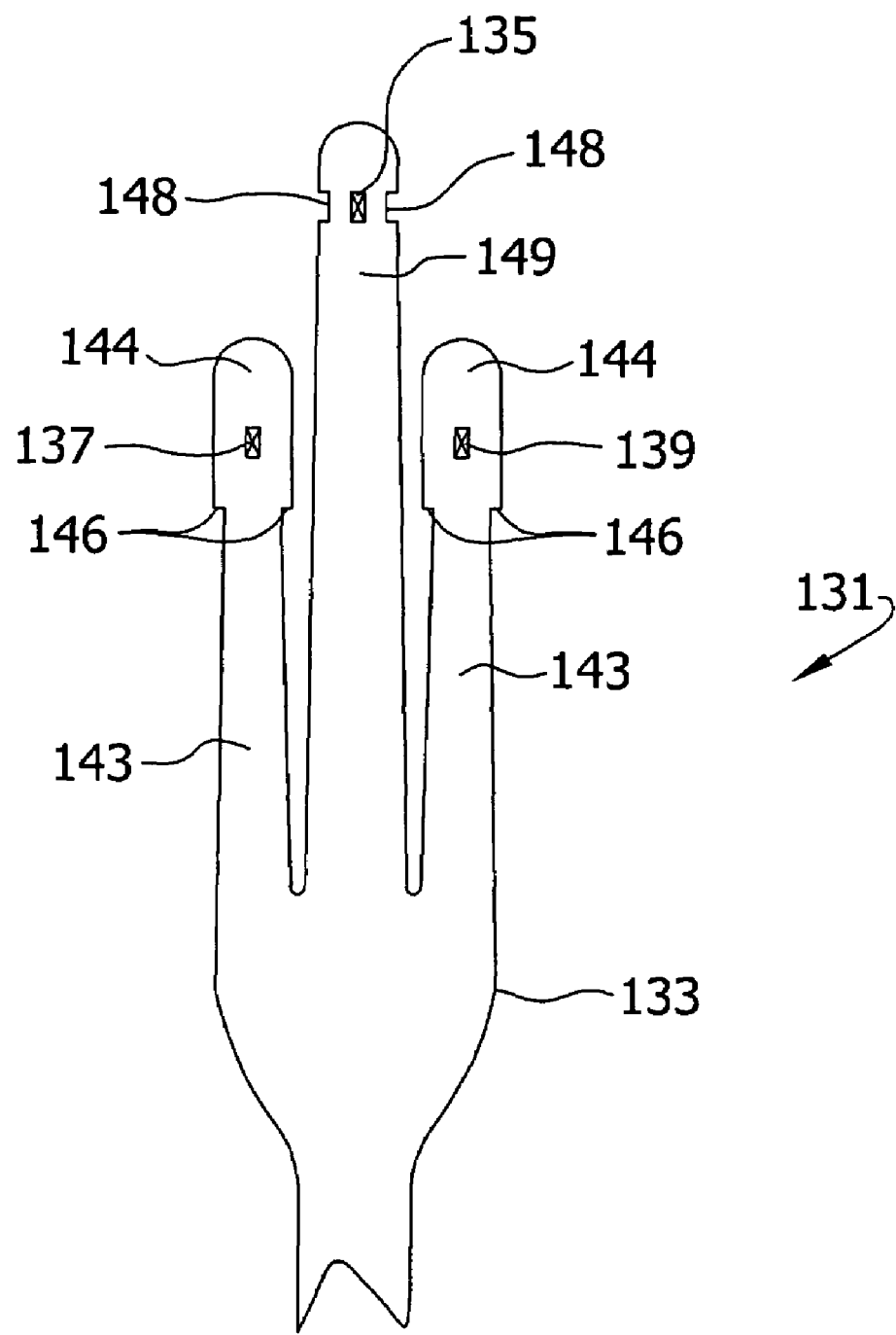
FIG. 11 is an elevation of a flex circuit of the probe of the second embodiment.
Figure 12:
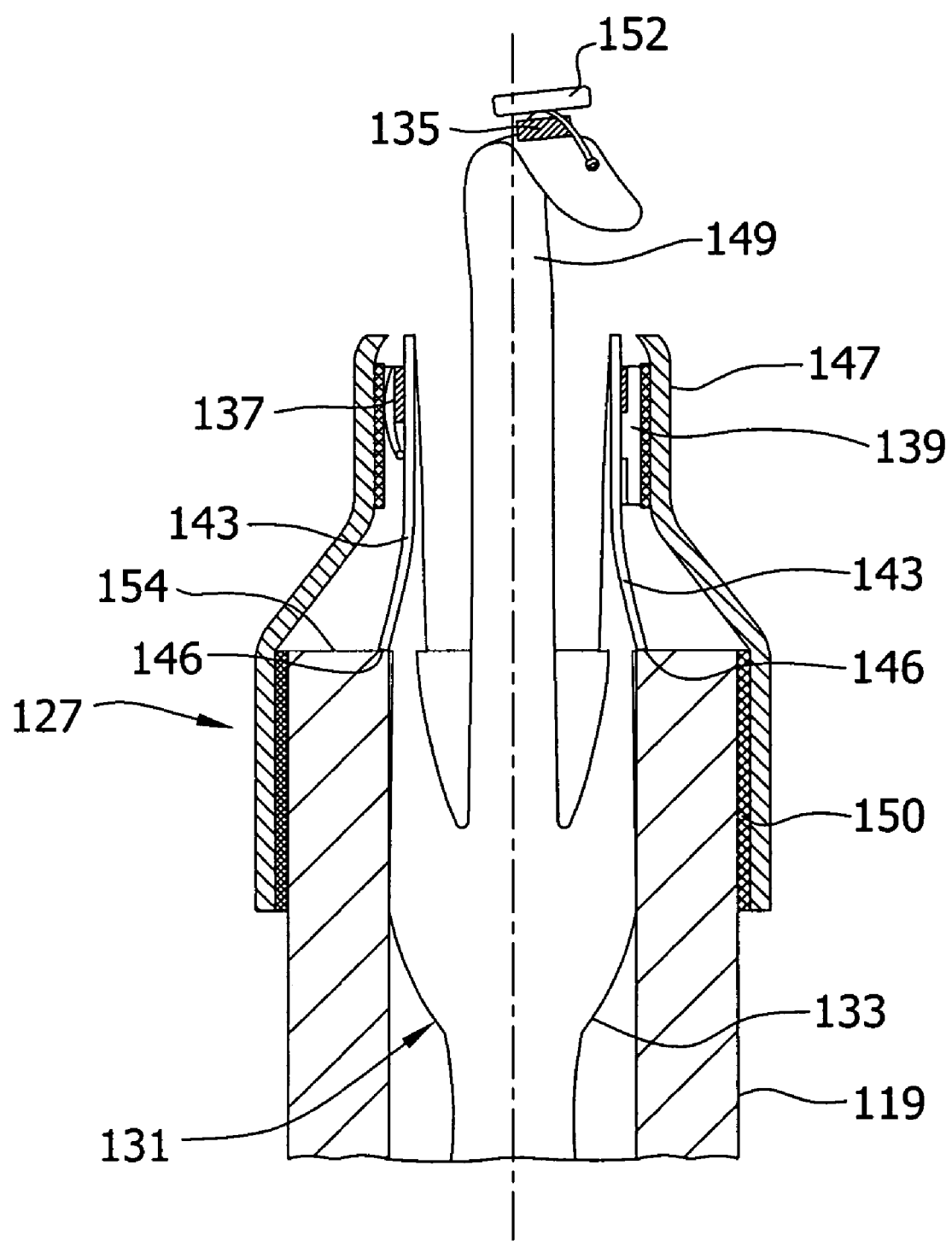
FIG. 12 is a fragmentary section of a free end of the probe of the second embodiment showing a flex circuit inserted into a separator and probe shaft.
Figure 13:
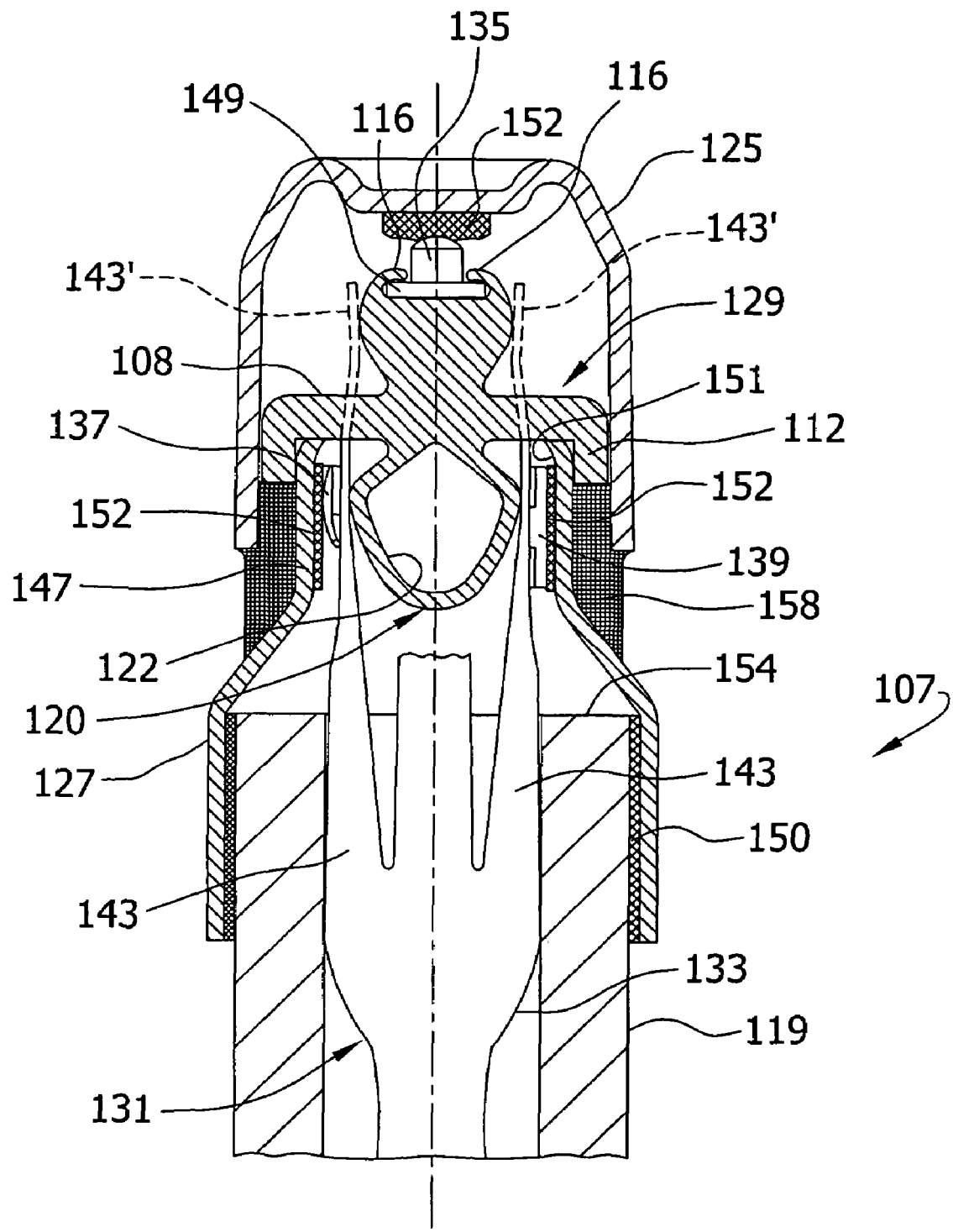
FIG. 13 is a fragmentary section of a free end of the fully assembled probe of the second embodiment.

Referring now to FIGS. 9-12 a probe 107 of a second embodiment is shown. Parts of the probe 107 of the second embodiment corresponding to those of the probe 7 of the first embodiment will be given the same reference number, plus "100". An isolator 129 of the probe 107 is shown to comprise a disk 108 having a slot 110, and an annular skirt 112 depending from the peripheral edge margin of the disk. A platform 114 formed with the disk 108 is located above the top of the disk. The platform 114 has a pair of protrusions 116 (broadly, "locating structure") that extend upward from a top surface 118 of the platform (FIG. 9). A resilient locator indicated generally at 120 depends from the disk 108 (FIG. 10). The resilient locator 120 has a generally tubular shape and defining a cavity 122 that extends through the resilient locator (FIG. 13). The locator 120 is resiliently deformable, as by deflecting to a more flattened configuration, for use in locating electrical components of the probe. Preferably, the isolator 129 is made of a thermally insulating material that is also resilient for reasons explained more fully hereinafter.

The probe 107 includes a flex circuit 131 comprising a deformable substrate 133 including a pair of arms 143 and a head 149 (FIG. 11). In its undeformed position, the arms 143 extend generally parallel to the head 149 along opposite sides. The ends of the arms 143 are formed with enlarged stop tabs 144. The tabs define shoulders 146 at their intersections with thinner parts of the arms 143. A separator thermistor 137 and a resistor 139 are mounted on respective ones of the stop tabs 144. The distal end of the head 149 is formed with notches 148 on opposite sides of the head. A tip thermistor 135 is attached to the flex circuit substrate 133 between these notches 148. The flex circuit 131 can be assembled with other components to form the probe 107.

Assembly of the probe 107 of the second embodiment may be carried out as follows. A tubular separator 127 is attached to the distal end of a probe shaft 119 in a suitable manner such as by applying epoxy 150 to the upper end of the shaft and/or lower inside diameter of the separator. In preparation for subsequent attachment steps, a thermally conductive epoxy may be applied to the tip thermistor 135, separator thermistor 137 and resistor 139. The epoxy may be applied at 152 to these electrical components. It will be noted that the tip thermistor 135, separator thermistor 137 and resistor 139 are located on the "outside" of the flex circuit substrate 133 in this embodiment so that they directly contact the tip 135 and separator 137 (respectively). However, the tip thermistor 135, separator thermistor 137 and resistor 139 could be placed in a more conventional position on the inside of the flex circuit substrate 133 (i.e., so that the substrate directly contacts the tip and separator rather than the electrical components). The flex circuit substrate 133 can then be pulled through the probe shaft 119 from its distal end until the shoulders 146 on the stop tabs 144 of the arms 143 engage an annular distal end surface 154 of the shaft and resist further movement of the flex circuit relative to the shaft (FIG. 12). Instead of bending at right angles to their length like the cruciform flex circuit substrate 33 of the first embodiment, the arms 143 of the flex circuit substrate 133 are twisted nearly parallel to their lengthwise extent so that they are oriented nearly orthogonally to a plane including the head 149 when inserted into the probe shaft 119. The stop tabs 144 are in generally opposed relation and the separator thermistor 137 and resistor face 139 (and preferably engage) a generally cylindrical interior wall 151 of the separator 127 within a neck 147 of the separator.

The isolator 129 is placed onto the neck 147 of the separator 127 with the top portion of the neck received within the skirt 112 of the isolator (FIG. 13). The head 149 of the flex circuit substrate 133 is threaded through the slot 110 so that it may extend above the isolator 129. The resilient locator 120 of the isolator extends into the neck 147 of the separator 127 and is deformed inwardly by engagement with the stop tabs 144 of the flex circuit substrate 133. The resilient locator 120 pushes the stop tabs 144, and the separator thermistor 137 and resistor 139 mounted on them outward against the inner wall of the separator. In this way the resilient locator 120 biases the thermistor 137 and resistor 139 against the interior wall 151 of the separator 127 for achieving good contact with the separator before the epoxy 152 is set.

The head 149 of the flex circuit substrate 133 is bent over in a direction transverse to the longitudinal axis of the probe shaft 119 and placed on the platform 114. The head 149 is pushed down toward the top surface 118 so that the notches 148 receive the protrusions 116. The edges of the notches 148 frictionally engage the protrusions to grip and hold the head 149 in position. Thus, the tip thermistor 135 is located accurately, lying substantially on the probe shaft axis. The isolator 129 grips the head 149 so that it is held in place prior to final assembly of the probe 107. An aluminum tip 125 is then attached to this subassembly. Epoxy 158 is preferably applied to the outside of the separator neck 147, and the tip 125 is pushed onto the end of the separator 127 over the isolator 129. The previously applied epoxy 152 on the tip thermistor 135 engages an interior central portion of the tip 125. The entire assembled probe 107 can be placed in an oven for curing the epoxy and achieving final fixation of the various components. Other suitable ways of securing the components together may be employed within the scope of the present invention.

In a modified version of the probe of the second embodiment, the arms 143' of the flex circuit substrate 133 would be longer (see phantom illustration in FIG. 13) so that they extend through the isolator 129. The isolator would be formed with additional slots (not shown) to receive the arms 143' through it. The separator thermistor 137 and resistor 139 would still be in the same location against the sides of the separator 127. In this modified version, the isolator would further aid in holding the arms in position after they are deformed from their undeformed position (e.g., as shown in FIG. 11). It will be appreciated that other ways of locating the electrical components of the flex circuit in place prior to their final fixation may be used without departing from the scope of the present invention.

Figure 16:
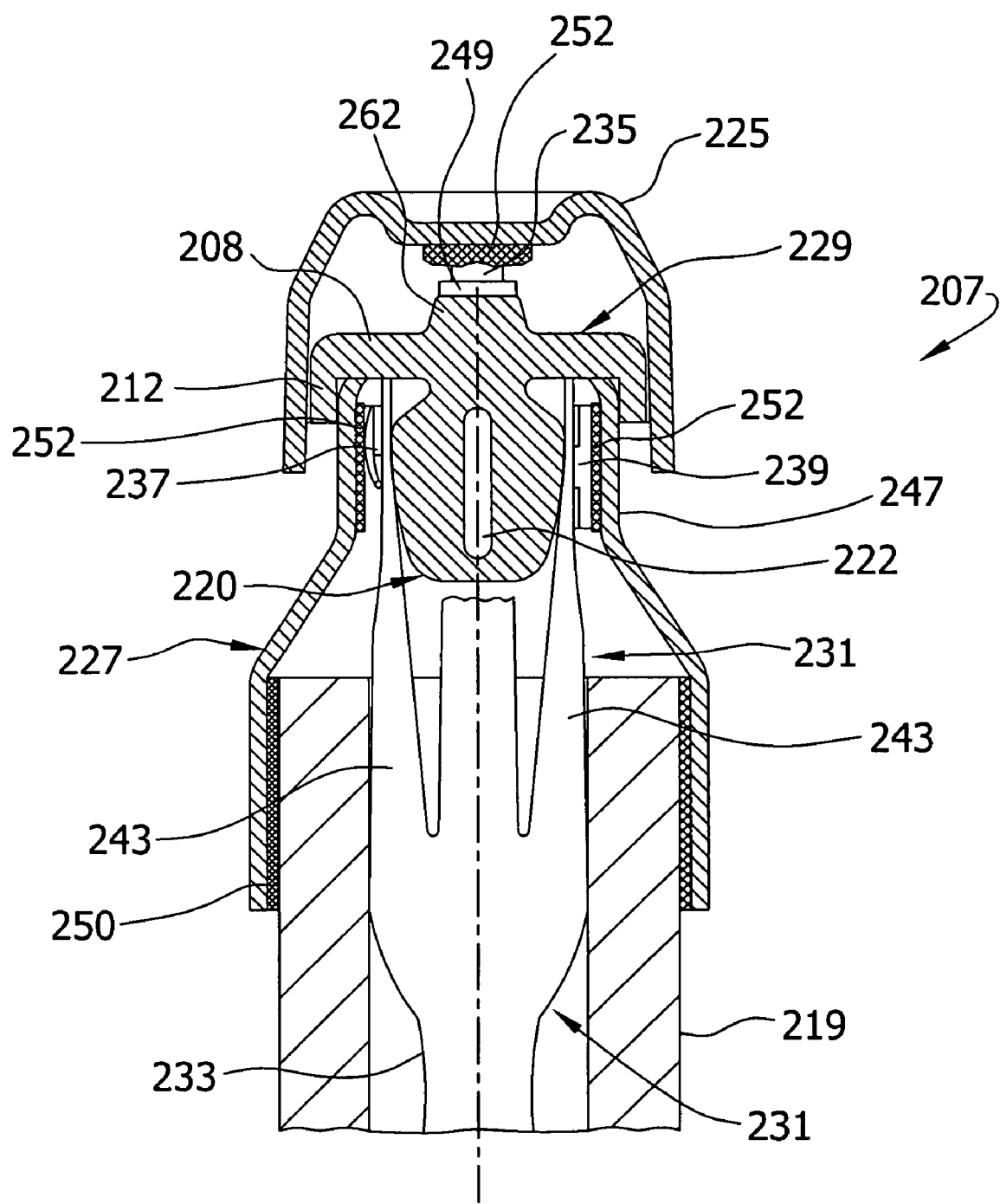
FIG. 16 is a fragmentary section similar to FIG. 13, but showing the probe of a third embodiment.

A fragmentary portion of a probe 207 of a third embodiment is shown in FIG. 16. Parts of the probe 207 corresponding to the probe 7 of the first embodiment are designated by the same reference numbers, plus "200". Parts corresponding to those of the probe 107 of the second embodiment will be given the same reference numeral, plus "100". A probe shaft 219, tip 225 and separator 227 may be substantially similar to the prior embodiments. A flex circuit 231 can have a deformable substrate 233 that is similar to the substrate 133 of the second embodiment shown in FIG. 11. However, a head 249 of the flex circuit substrate 233 would not have the notches 148 because the head 249 is not held in place by an isolator 229 in the third embodiment.

Figure 14:
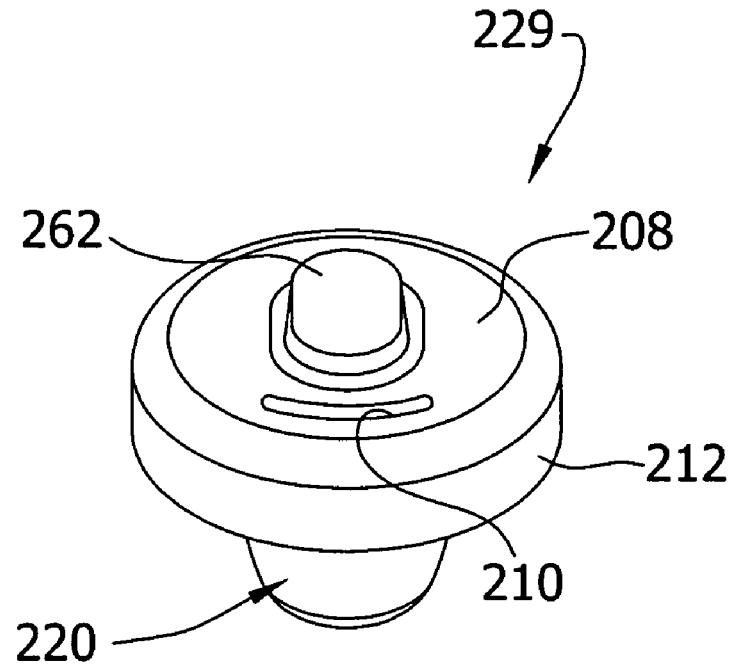
FIG. 14 is a top side perspective of an isolator of a probe of a third embodiment.
Figure 15:
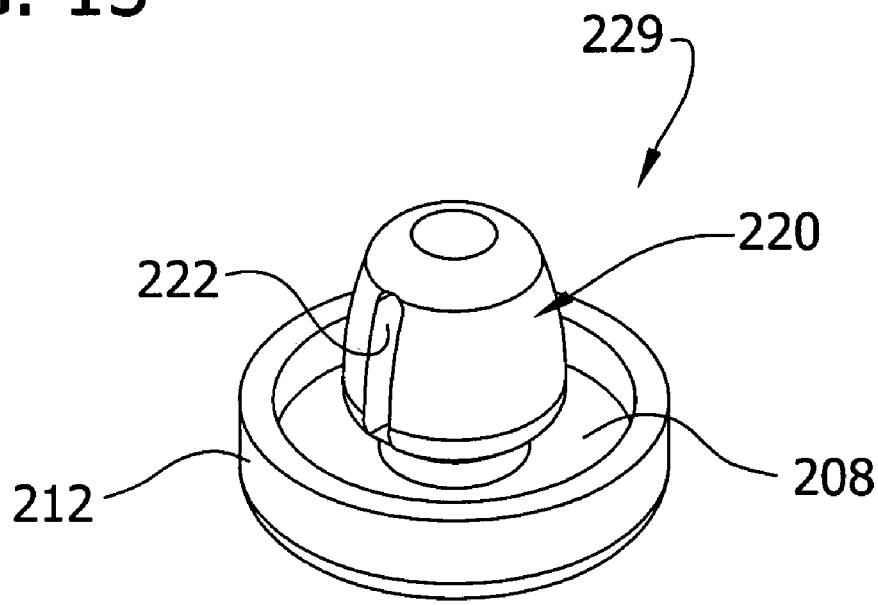
FIG. 15 is a bottom side perspective of the isolator of FIG. 14.

Referring to FIGS. 14 and 15, the isolator 229 comprises a disk 208 and a skirt 212 that depends from the peripheral edge margin of the disk. A slot 210 is formed in the disk 208 for receiving the head 249 through the isolator 229. A resilient locator 220 extends down from the disk 208. When the isolator 220 is attached to the probe 207 it is deflected in the same way as the locator 120 of the second embodiment and performs the same function of locating a separator thermistor 237 and resistor 239 (FIG. 16). A cavity 222 extending through the resilient locator 220 permits the locator to deform for applying a spring force to the thermistor 237 and resistor 239. The top of the isolator disk 208 is formed with a flat or bridge 262 and receives the head 249 of the flex circuit substrate 233 when it is bent over onto the isolator 229.

When the tip 225 is applied to the probe shaft 219, separator 227 and isolator 229, the tip engages a tip thermistor 235 and pushes the tip thermistor down. The bridge 262 (acting as a reaction surface) pushes upwardly to urge the tip thermistor 235 toward the tip 225 and ensure good contact with the tip. Epoxy between the tip thermistor 235 and tip 225 can be used as before to make the final fixation. As stated previously herein with respect to the second embodiment, the tip thermistor 235, separator thermistor 237 and resistor 239 could be located on the inside of the flex circuit substrate 233 so that the substrate (and not the tip thermistor, separator thermistor or resistor) directly contacts the tip 225 and separator 227 (respectively).

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. Moreover, the use of "up", "down", "top" and "bottom" and variations of these terms is made for convenience, but does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. An electronic thermometer comprising:
   a probe tip adapted to be heated to a temperature by an object for use in measuring the temperature of the object;
   a deformable circuit element including a deformable electrical conductor and at least one temperature sensor electrically connected to the electrical conductor for detecting the temperature of the probe tip;
   a probe shaft supporting the probe tip and deformable circuit element and including an end portion;
   a locating member further comprising a locating structure, wherein said locating structure comprises a nub projecting outward from the locating member and engaging an opening in the deformable circuit element for at least temporarily locating the deformable circuit element.

2. An electronic thermometer as set forth in claim 1 wherein said locating structure comprises a platform formed with the locating member, a portion of the deformable circuit element being held on the platform.

3. An electronic thermometer as set forth in claim 2 wherein the platform is formed with at least one protrusion extending upward from the platform, the protrusion capturing a portion of the deformable electrical conductor of the deformable circuit element.

4. An electronic thermometer as set forth in claim 3 wherein the deformable electrical conductor comprises a deformable substrate including at least one notch, the protrusion being received in the notch to hold the deformable substrate in position on the locating member.

5. An electronic thermometer as set forth in claim 1 wherein the locating member includes a bridge located generally at an end of the probe shaft, the bridge engaging a portion of the deformable circuit element.

6. An electronic thermometer as set forth in claim 5 wherein the deformable circuit element further comprises at least one other electrical device electrically connected to the deformable electrical conductor, and wherein the locating member biases said other electrical device against an interior wall of the separator.

7. An electronic thermometer as set forth in claim 6 wherein the locating member includes a resilient locator extending into the separator, the locator biasing said other electrical device against the interior wall of the separator.

8. An electronic thermometer as set forth in claim 7 wherein the locating member includes a cavity located to permit resilient deformation by the locator.

9. An electronic thermometer as set forth in claim 1 wherein the deformable circuit element further comprises at least one other electrical device electrically connected to the deformable electrical conductor, and wherein the locating member biases said other electrical device against an interior wall of the separator.

10. An electronic thermometer as set forth in claim 1 wherein the locating member comprises an isolator made of thermally insulating material.

11. An electronic thermometer as set forth in claim 1 further comprising a base unit and a cord connecting the probe shaft to the base unit.

12. A probe for an electronic thermometer comprising:
  a probe tip adapted to be heated to the temperature by an object for use in measuring the temperature of the object;
  a deformable circuit element including a deformable electrical conductor and at least one temperature sensor electrically connected to the electrical conductor for detecting the temperature of the probe tip;
  a probe shaft supporting the probe tip and deformable circuit element and including an end portion:
  a separator supported by the probe shaft; a locating member has a locating structure engaging the deformable circuit element, wherein said locating structure comprises a nub projecting outward from the locating member and engaging an opening in the deformable circuit element for at least temporarily locating the deformable circuit element.

13. A probe as set forth in claim 12 wherein said locating structure comprises a platform formed with the locating member, a portion of the deformable circuit element being held on the platform.

14. A probe as set forth in claim 13 wherein the platform is formed with at least one protrusion extending from the platform, the protrusion capturing a portion of the deformable electrical conductor of the deformable circuit element.

15. An electronic thermometer as set forth in claim 13 wherein the deformable electrical conductor comprises a deformable substrate including at least one notch, the protrusion being received in the notch to hold the deformable substrate in position on the locating member.

16. A probe as set forth in claim 12 wherein the locating member includes a bridge located generally at an end of the probe shaft, the bridge engaging a portion of the deformable circuit element.

17. A probe as set forth in claim 16 wherein the deformable circuit element further comprises at least one other electrical device electrically connected to the deformable electrical conductor, and wherein the locating member biases said other electrical device against an interior wall of the separator.

18. A probe as set forth in claim 17 wherein the locating member includes a resilient locator extending into the separator, the locator biasing said other electrical device against the interior wall of the separator.

19. A probe as set forth in claim 18 wherein the locating member includes a cavity located to permit resilient deformation by the locator.

20. A probe as set forth in claim 12 wherein the deformable circuit element further comprises at least one other electrical device electrically connected to the deformable electrical conductor, and wherein the locating member biases said other electrical device against an interior wall of the separator.

21. A method of making a probe for an electronic thermometer comprising:
  positioning a deformable circuit element together with a probe shaft;
  deforming the deformable circuit element;
  connecting a separator to the probe shaft;
  connecting a locating member to the probe shaft;
  interconnecting the deformable circuit element and locating member for use in locating the deformable circuit element;
  inserting an opening in the deformable circuit element onto a nub associated with the locating member.

22. A method of making a probe for an electronic thermometer comprising:
  positioning a deformable circuit element together with a probe shaft;
  deforming the deformable circuit element;
  connecting a separator to the probe shaft;
  connecting a locating member to the probe shaft;
  interconnecting the deformable circuit element and locating member for use in locating the deformable circuit element;
  inserting a receiving portion of the locating member into notches formed on the deformable circuit element.

23. A method as set forth in claim 21 further comprising biasing with the locating member a portion of the deformable circuit element against the separator.

24. A method as set forth in claim 22 further comprising biasing with the locating member a portion of the deformable circuit element against the separator.

* * * * *